United States Patent [19]

Cheng-Yon

[11] Patent Number: 6,118,196
[45] Date of Patent: Sep. 12, 2000

[54] ELECTRICAL GENERATOR ATTACHED TO A BICYCLE WHEEL

[75] Inventor: Tang Cheng-Yon, Taichung, Taiwan

[73] Assignee: Shing Chyoo Attend Industry Co., Ltd., Taichung, Taiwan

[21] Appl. No.: 09/264,580

[22] Filed: Mar. 8, 1999

[30] Foreign Application Priority Data

Mar. 26, 1998 [JP] Japan ...................................... 10-1826

[51] Int. Cl.⁷ .................................. H02K 1/14; B62J 6/12
[52] U.S. Cl. ..................... 310/75 C; 310/49 A; 310/164; 310/67 A; 310/257; 310/254
[58] Field of Search ............................... 310/75 C, 67 A, 310/257, 49 R, 164, 49 A, 263, 218, 67 R, 254; 362/192; 290/1 D

[56] References Cited

U.S. PATENT DOCUMENTS

| | | | |
|---|---|---|---|
| 2,243,318 | 5/1941 | Rawlings | 310/254 |
| 2,487,180 | 11/1949 | Rawlings | 310/254 |
| 2,901,645 | 8/1959 | Sulger | 310/166 |
| 4,677,328 | 6/1987 | Kamakura | 310/67 R |
| 5,828,145 | 10/1998 | Nakamura | 310/67 A |

*Primary Examiner*—Nestor Ramirez
*Assistant Examiner*—Karl E. Tamai
*Attorney, Agent, or Firm*—Harrison & Egbert

[57] ABSTRACT

A bicycle dynamo having enhanced power dynamics by having a large number of magnets 63 in alternate polarity lined up at a fixed interval along the inner circumference of the rotating mechanism 60. A circular lining 70 is outfitted and anchored around the perimeter of the main axle 20 with a transformer strapped to it. The transformer container a coil unit 81 and tow core parts; with the two core units sandwiching the coil unit 81 at its two sides. Each of the core unit is a stack having two or more core discs 82a, 82b. At an even interval around the circumference of the core disks 82a, 82b, fixed number of raised anchors 821a, 821b are formed that interconnect with different core disk anchors 821a, 821b to form a fixed set of the claw unit. Furthermore, each of the claw unit from the two core components 82 are extended out between the coil unit 81 and the magnets 63.

1 Claim, 11 Drawing Sheets

6,118,196

ELECTRICAL GENERATOR ATTACHED TO A BICYCLE WHEEL

TECHNICAL FIELD

The preferred embodiment proposed relates to a electrical generator, particular referring to a an electrical generator for a bicycle capable of generating substantial current

BACKGROUND ART

Of conventional electrical generators available as shown in FIG. 11, they primarily involve having a permanent housing 10 anchored to an appropriate spot the bicycle wheel hub 1 and the main shaft, 2 with a large number of inductive coils 12 around the permanent housing 10 so to have the electrical generator containing a large number of permanent magnets 14 rotatable between the spoke and hub. Where the magnets on the rotator 13 and the inductor 12 are kept at an adequate distance for alternating rotation, the negative charge emitted through the magnets will cut off the negative charge on the inductive coil 12. The start-up charge generated by the inductive coil 12 traveling along the bicycle wheel will generate charge to supply the power needed.

Most conventional electrical generators are indeed able to generate adequate power through this method; however, the amount of current or voltage generated were not as sufficient, and tended not to fill the demands. This means that when the rotator and magnets 14 are in synchronized rotation, the magnetic draw win trigger the inductive coil 12 to move in the same direction, hence the start-up current generated at the inductive coil 12 will be limited to a certain level. This is similar to a mini dynamo installed on a bicycle that may provide power to light up the head light, but may not be able to project the-light beam to an extended range, which stands to impact the safety of operating at night. Hence, the issue related to insignificant operable current voltage generated through conventional dynamos is hereby addressed.

The preferred embodiment aims to address problems related to conventional bicycle electrical generators with an objective of offering a more substantial power generation.

SUMMARY OF THE INVENTION

To achieve the aforementioned objective, the design proposed is to have a bicycle electrical generator positioned between the position shaft and the rotatable shell around the position shaft. Magnets of reversed polarities at a set interval are lined up along the inner perimeter of the rotator, with insulation formed around the core tub of the main shaft, and a conductive annular lining, coil unit and two core components are anchored at the annular lining on the outer surface of the core tube. Each of the core components is stacked by at least two core round disks with a set number of legs intersecting with adjacent legs alternately between each of the disks, with the core round disk legs alternately forming a set number of claw units. Each of the claw units between the two core components are then made to extend outside between the coil unit and the magnets to constitute the a basic makeup of a electrical generator device.

In the preferred embodiment of the bicycle electrical generator, an interlocking device at a fixed interval is reserved along the perimeter of the rotator at the main shaft that accommodates the shell containing round disks. The space between the round-disk shell and the shell housing is made into a compartment that accommodates the rotator and generator. Transmission pitches are then formed along the perimeter of the rotator with a large number of round blocks formed at the transmission end at a fixed interval. Shockproof rubber tips are then put over each of the round blocks, where the width of the rubber tips is fit into the width formed by a bicycle wheel's spoke to drive the rotator and the wheel in a synchronized rotation. The rotator is formed by a bicycle wheel hub, on which male screws are attached to to the position shaft with cotter grooves reserved around the position shaft to anchor the electrical generator.

The preferred embodiment of a bicycle electrical generator concerns having 2 sets of core components outfitted to the coil unit at the position shad Where each of the core components are formed by at least two sets of round core disks with legs extended in an engagement to form claw units. As a result, each of the claw units formed by various legs will bring forth a resisting change between the N and S ends, as magnetic charges penetrate through the annular lining to generate AC current with at least 2 courses or more of staring power. While as the AC current generated is of a disproportioned positive curve, a combined positive curve made by at least 2 courses will be similar to a trapezoidal curve since this type of trapezoidal curve is more powerful than a simple positive curve. Thus under the circumstances of a reserved force of a same level, it tends to be able to generate a current with more biting voltage.

DETAILED DESCRIPTION OF THE PRESENT INVENTION

Figure 1:
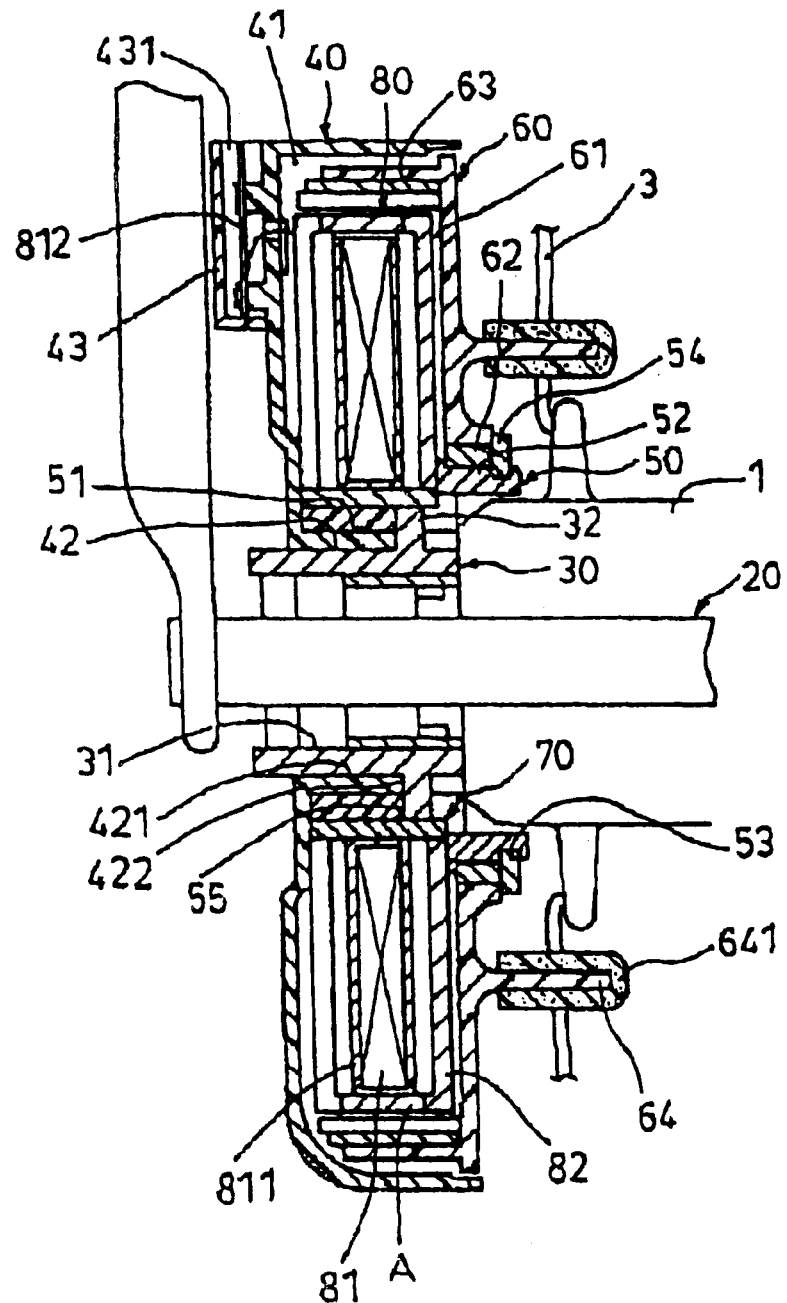
FIG. 1 A cross-section view of a preferred bicycle dynamo proposed by the design.
Figure 2:
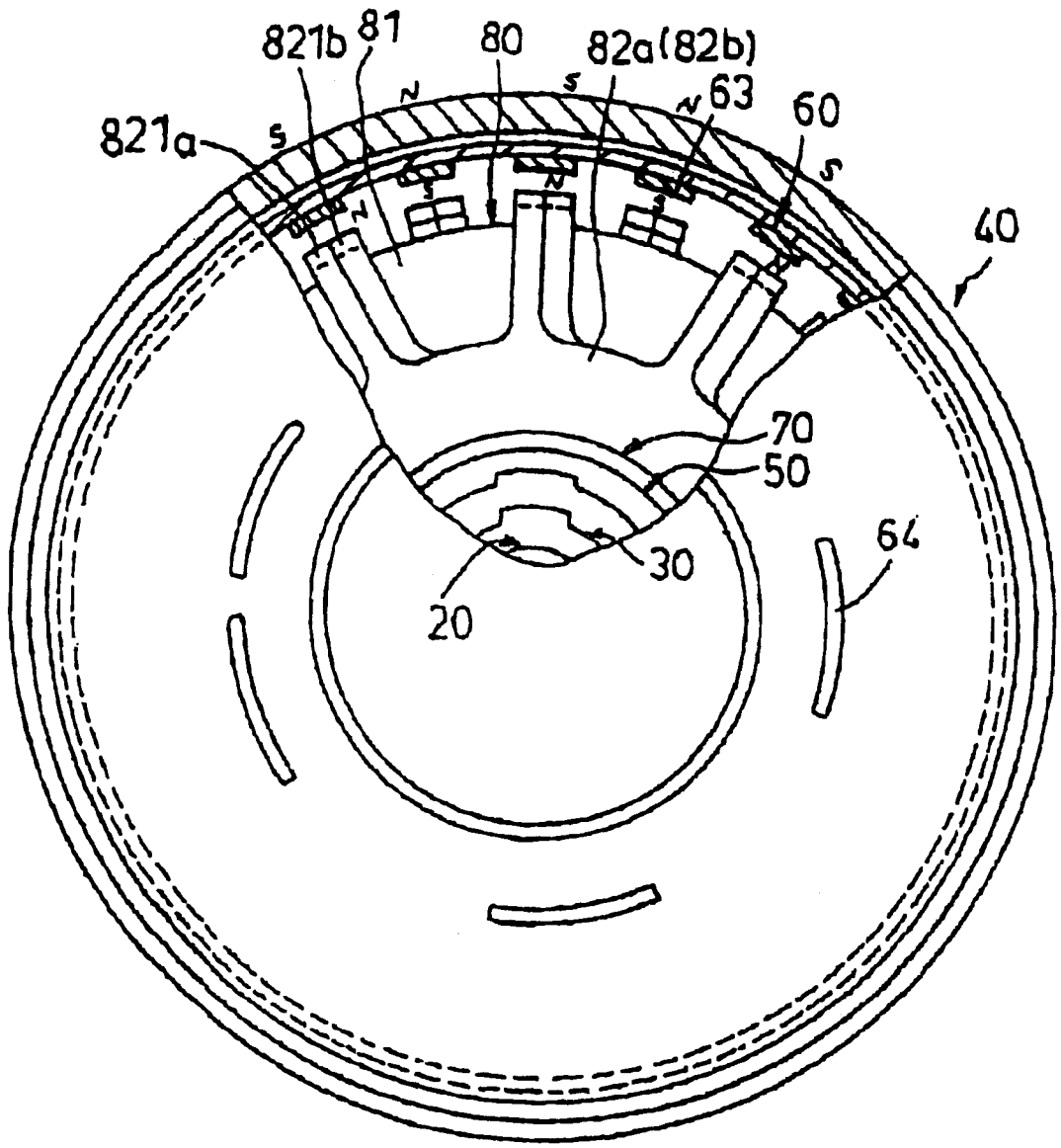
FIG. 2 An area cross-section view of the bicycle dynamo shown in FIG. 1.

Following provides some of the practical implements on the preferred embodiment, but shall not be regarded as limits to designs that derive from the proposed mechanism.

The preferred embodiment of a bicycle electrical generator, as depicted in FIGS. 1–4, may be incorporated in a variety of scenarios, particularly referring to the rotation of a bicycle wheel hub that triggers power generation to light up a bicycle headlight Of the preferred embodiments proposed by the design, the electrical generator is made of several round disks, and primarily comprised of a position shaft 20, a earth-welding plate 30, a position wood base 40, a core tube 50, a rotator 60, a annular lining 70 and at least one dynamo 80.

The position shaft refers to the position structure inserted over a bicycle hub, where the bicycle hub 1 rotates around the perimeter of the main position shaft 20.

A earth-welding plate 30 is inserted over the center of the shaft opening 31 with the position shaft 20 inserted in place. The corresponding spots around the circumference of the earth-welding plate are outfitted with contact points 32 at a fixed interval, with a multiple number of stop strips fit over the outer edge.

The position structure 40 and the stationary insulated round-disk shell proposed in the preferred embodiment has a plastic material formed as the position structure 40, the concave within it has been made into a compartment 41, where hollow tubes 42 are formed at the center of the tube 42. Cotter grooves 421 are rorned around the perimeter of the shaft tube 42 that holds the position structure 40 over at the attached earth-welding plate. A multiple lumber of raised stoppers are outfitted around the outer edge of the shaft tube 42 with two openings 422 at corresponding spots on the shaft tube 42, where the earth plate 30 has its contact inserted into the openings 422. Sockets 43 are then put at designated spots on the position structure, with an insertion hole formed at the topside of the socket base 431 to accommodate inserting an appliance.

A core tube 50 is primarily a plastic component that insulates, with cotter hole 51 incorporated to accommodate inserting the shaft tube 42 along the center of the shaft, with its one end coated (the coating method refers to having a metal piece fabricated first, then placed into a cast to form an even coating) inserted into the metal shaft plate 52, connecting the rotator 60 at the shaft base 52 making the outer edge of the shaft base contact the outer recessed grooves 53. A C-clamp is assembled into the stop groove to control the rotator 60. A through hole 55 is installed at a proper spot along the outer perimeter of the core tube to allow raised contacts on the earth plate 30 to insert into the through hole 55.

The rotator 60 appears as a rotatable disk-like shell structure formed by plastic material with a concave recess 61 reserved in its inside to accommodate the dynamo 80. A shaft liner 62 is installed at the center that sets the rotator 60 over the shaft base 52. Meanwhile, a set number of magnets 63 are placed over the exterior of the rotator 60 at a fixed interval, with magnets aligned in an alternate reserved polarity of N-S-N-S configuration. A transmission pitch is set around the perimeter of the rotator 60 (the transmission pitch being a multiple number of round blocks set at a fixed interval) with shock-proof rubber tips 641 capped over the transmission pitch 64. The width of the shock-proof rubber tips are made to fitted into the space between the spokes on the bicycle wheel regulating the rotator 50 and the wheel to rotate in synchronized direction.

The annular lining 70 is of a ring structure installed at the center of the position structure 40. In the preferred embodiments, it is installed at the outer perimeter of the core tube 50 and is of highly conductive material.

Figure 3:
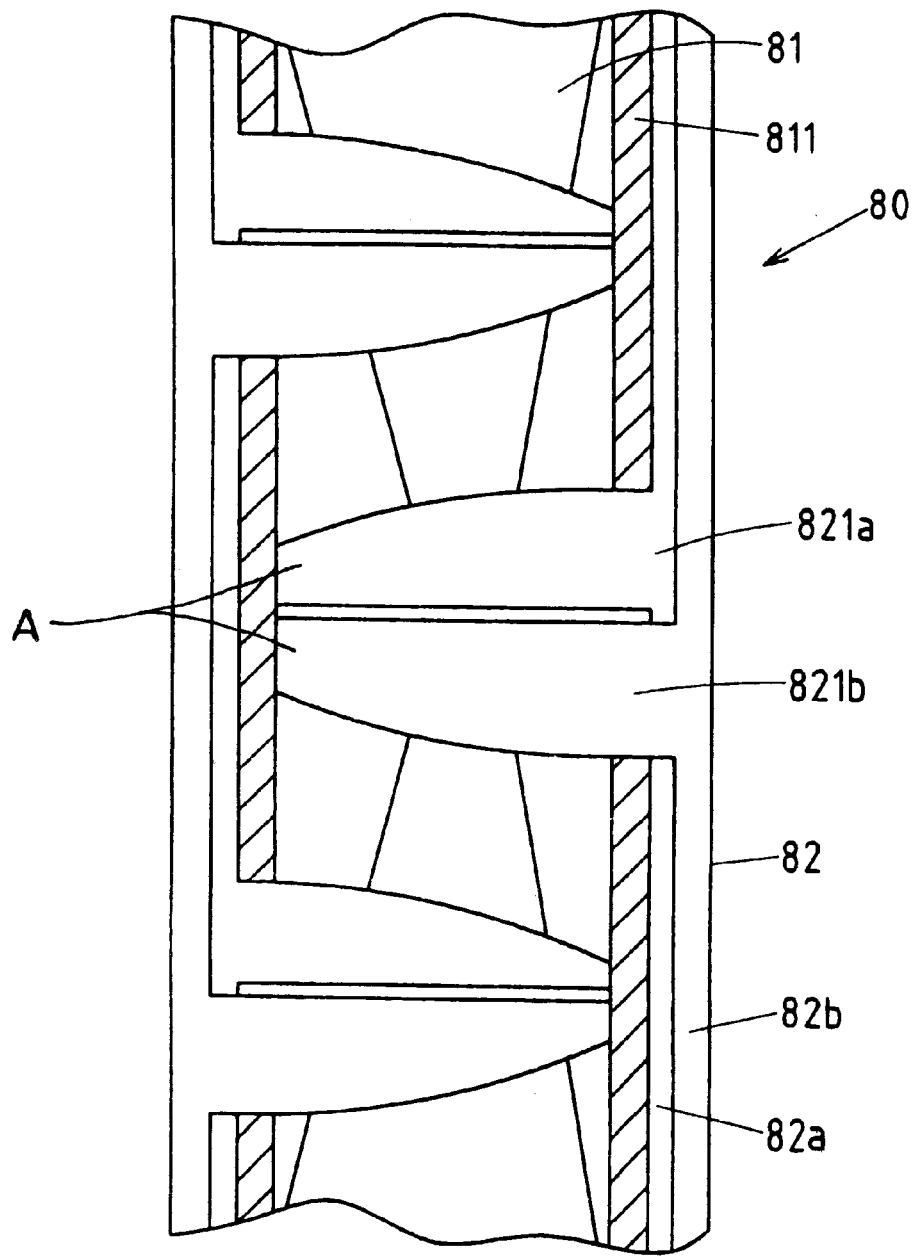
FIG. 3 A perspective view on assembled bicycle dynamo.

Please refer to FIG. 3 for specifics that pertain to a dynamo 80, which is inserted around the annular lining 70. The position structure 40 and the compartment 41 close the components of the dynamos, manufacturers may have multiple sets of dynamos installed according to practical application needs. In the illustration, only one is used. The dynamo is comprised of a coil unit 81 and a core unit 82 having two components 82. The coil unit 81 is made by winding coil around the shaft yoke 811, the live wire (referring to leads found in a speed train where the grounds are negative and the overhead being positive) of the coil unit 81, is connected to contact 812, which is inserted into the socket 43 forming a live wire circuit on the core unit 82. On the other hand, the earth end of core unit 81 is connected to the annular lining 70 as the earth end of annular lining 70 is in to the raised contact point, with contact made through the earth plate 30 to the position shaft via the cotters, forming a ground circuit on coil unit 81. In addition, the two core components are placed in front and behind the coil unit 81 with each of the core components of core unit 82 are comprised of at least two core disks 82a, 82b stacking together. The outer perimeter of the core disks 82a, 82b has a set number of legs 821a, 821b formed with these legs 821a, 821b alternating each other to form a fixed sets of claw units. Each set of the claw unit extended from the core components are assembled at the space between the coil unit 81 and the magnets 63.

The particulars related to the power generating theory and functions of the preferred embodiment of a bicycle electrical generator are outlined as follows.

Figure 4:
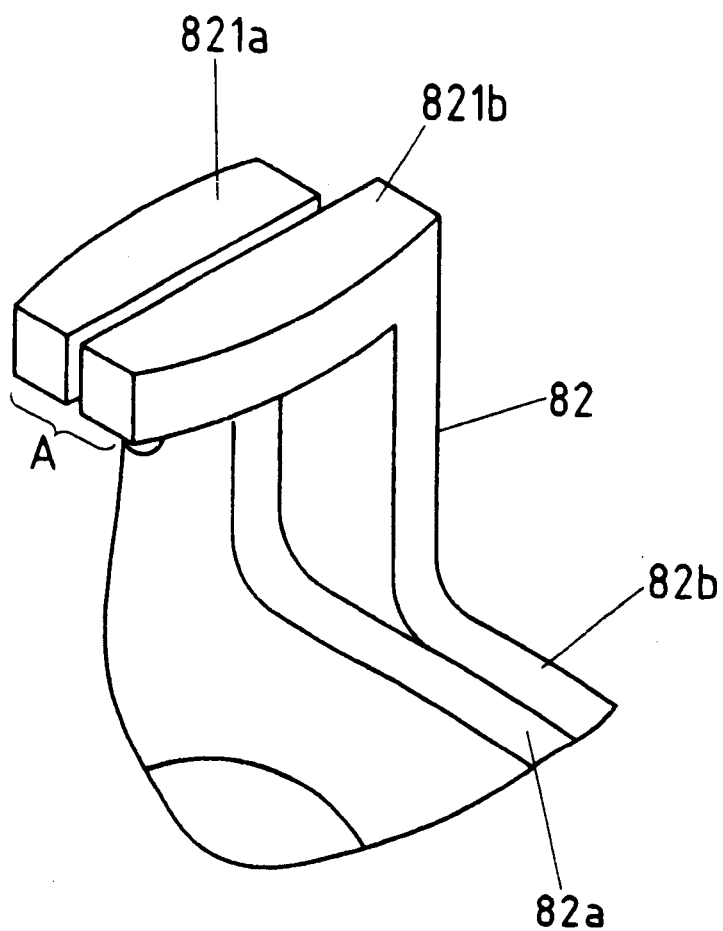
FIG. 4 A angular view on the engagement of the claw units of a bicycle dynamo.
Figure 5:
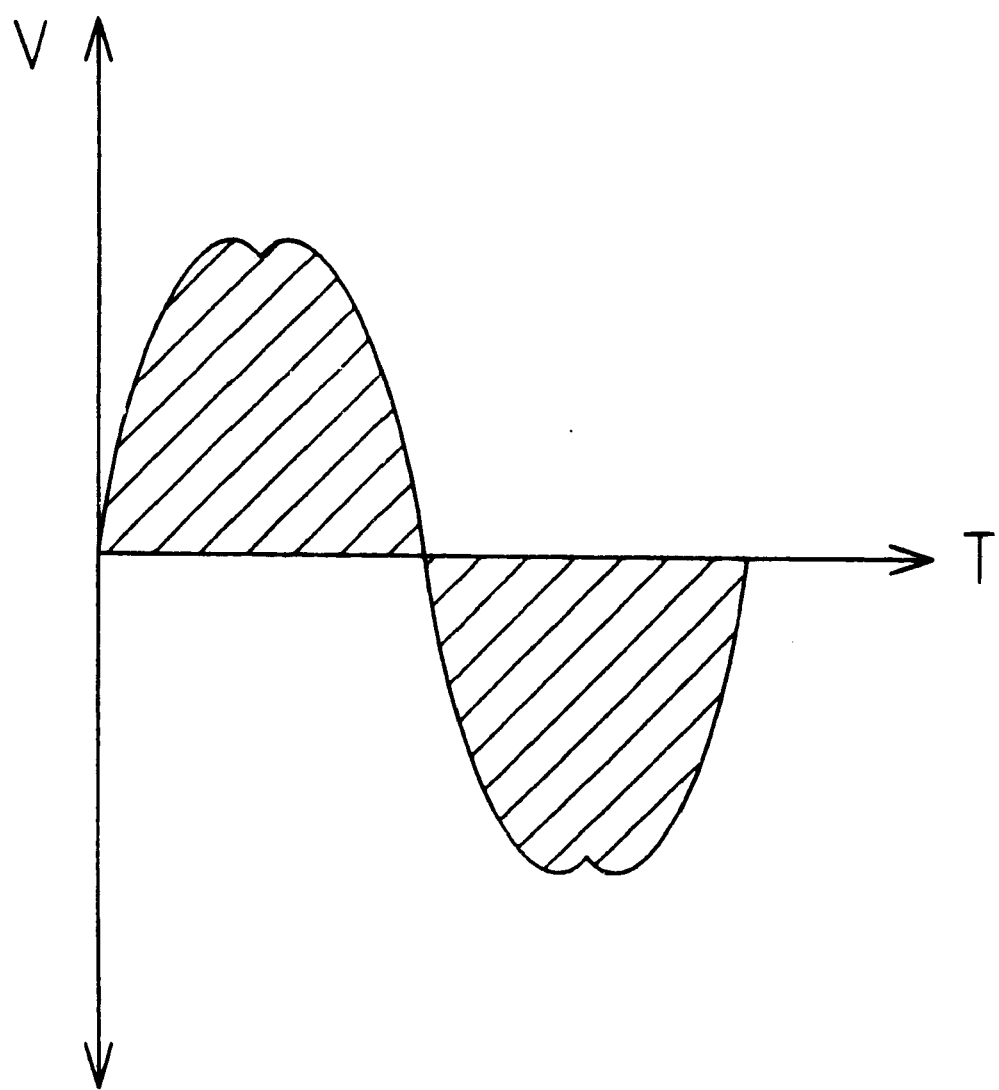
FIG. 5 A drawing on staring up of a bicycle dynamo.

The claw unit A proposed in the design, as shown in FIG. 4 and FIG. 5, are formed by interconnecting in a left-right direction by at least two sets each of the legs 821a, 821b on the core round disks 82a, 82b. The polarity formed by each of the legs 821a, 821b generating a N charge and an S charge will allow the magnetic charge to penetrate through the annular lining 70. This produces an A.C. charge that suffices to provide at least 2 courses of starting power. Also since the A.C. power generated offers a disproportionate positive curve, thus the synthesized starting power made up by at least two positive courses will come to a trapezoidal-like curve as shown in the sketch (as measured through an oscillation recorded by the inventor). The greater the number of the legs 821 will generate a more trapezoidal curve, which is proven to provide stronger starting power than a normal positive curve. As a result, the voltage and current generated under equal conditions through the proposed bicycle electrical generator offers more power than most conventional designs, thus producing more luminosity in the application of a bicycle headlight.

The disk-configured dynamo proposed has 2 sets of core components of core unit 82, where each of the core components has at least two sets of round disks 82a, 82b stacked against each other with legs extended in an alternating way to form claw unit A. For power generated through magnetic charges, the total staring power generated by claw unit A will come to a trapezoidal-like curve that offers a more powerful starting kick. Therefore, operating under equal conditions, the amount of power generated tends to be much more substantial than most conventional dynamos providing a superior operating condition for driving an electrical device.

Figure 6:
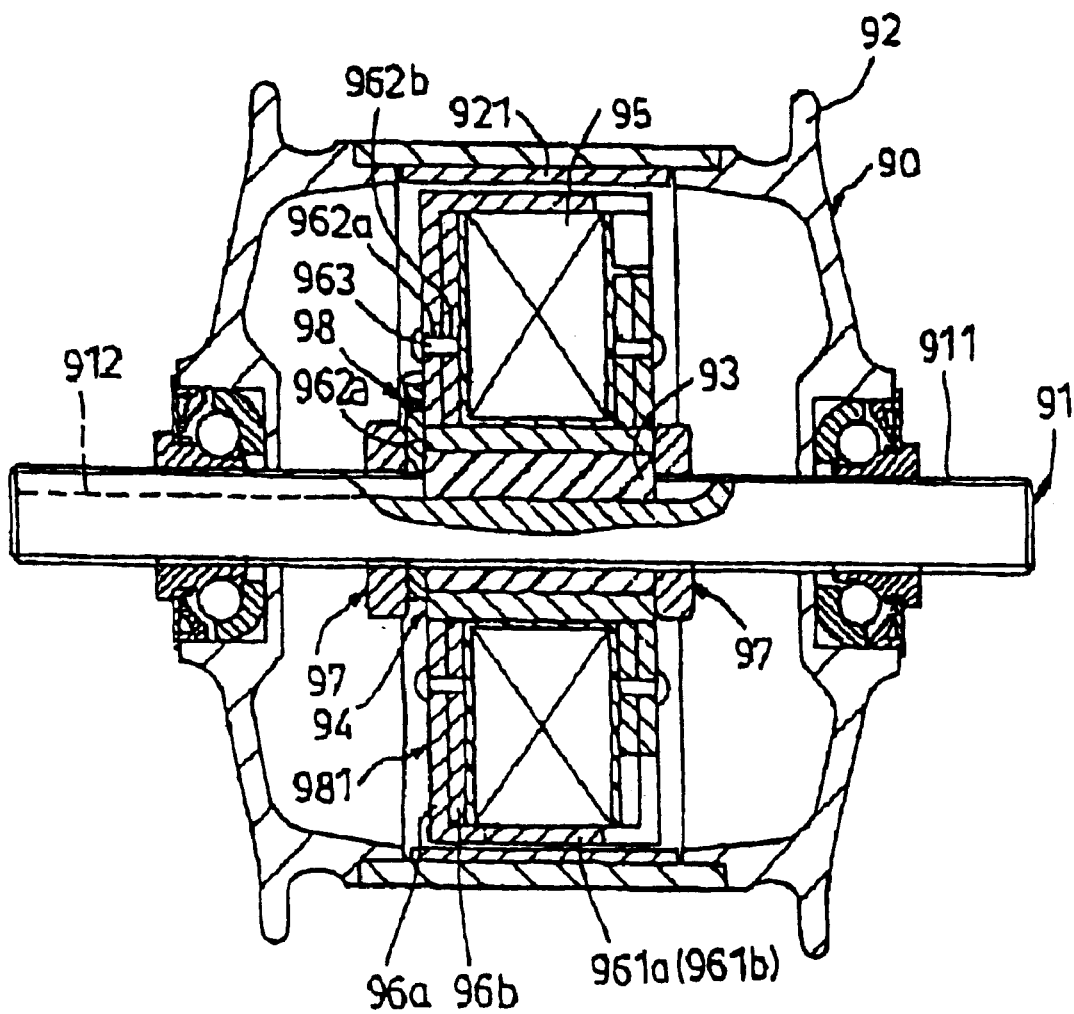
FIG. 6 A cross-section view of another bicycle dynamo implement proposed by the design.
Figure 7:
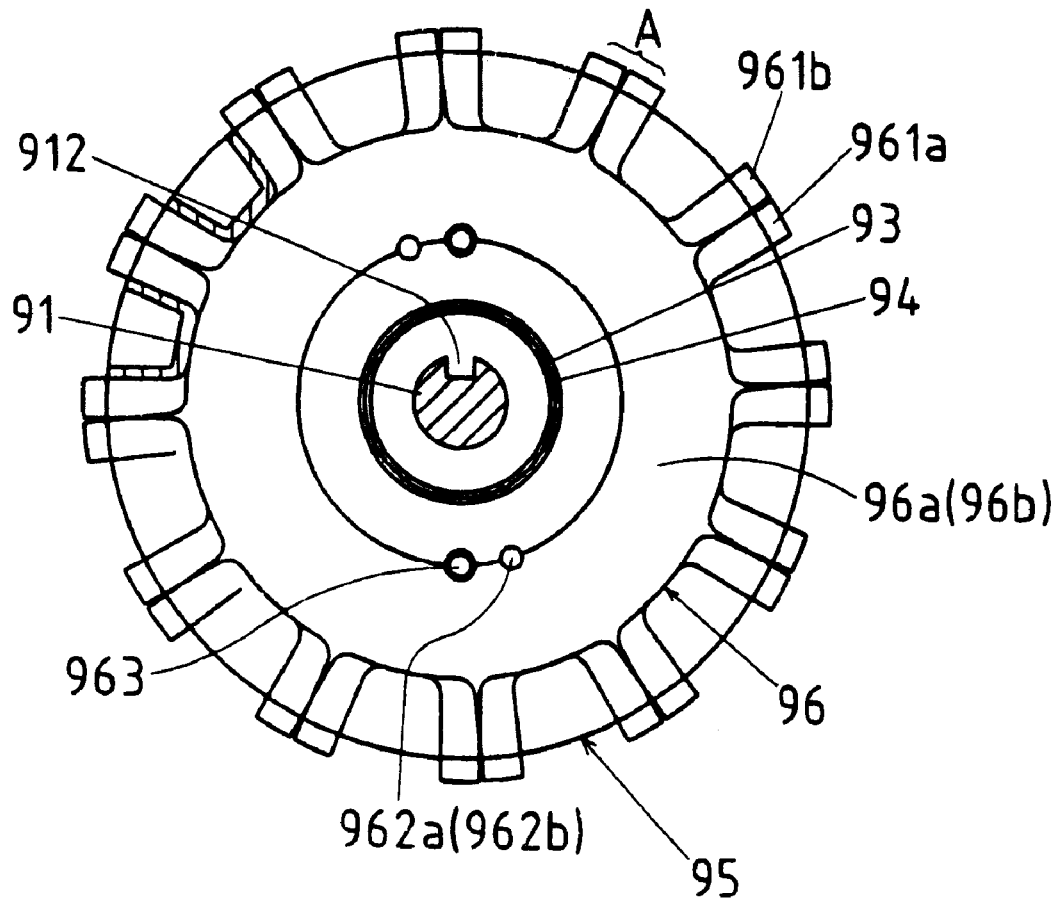
FIG. 7 A side view of the bicycle dynamo shown in FIG. 6.

Shown in FIG. 6 and FIG. 7 are some of the preferred embodiments as proposed by the design. In these embodiments, the rotator is put over the wheel hub directly. In this embodiments, despite that it is installed similar to earlier mentioned bicycle dynamos, it remains a hub dynamo 90 that is primarily comprised of a position shaft 91, a wheel hub 92, a core tube 93, a spiral lining 94, a core unit 95, a core component 96 and two position devices 97. Threading all is formed on the position shaft 91, with axial cotter grooves 912 reserved along the outer perimeter of the position shaft 91. A multiple number of polarity alternating magnets 921 are lined at a fixed interval along the inner walls of the wheel hub 92. The core tube 93 made of insulated material is wrapped around the perimeter of the position shaft, and the annular lining 94 is set to cover the core tube 93. The coil unit 95 and core component 96 are assembled near the annular lining where legs 961*a*, 961*b* extending from the outer perimeter of at least two round disks 96*a*, 96*b* are made to interlock alternately forming claw unit A. This provides an advantage of an equal amount of power generated by the round disk-type of dynamo design mentioned earlier.

Figure 9:
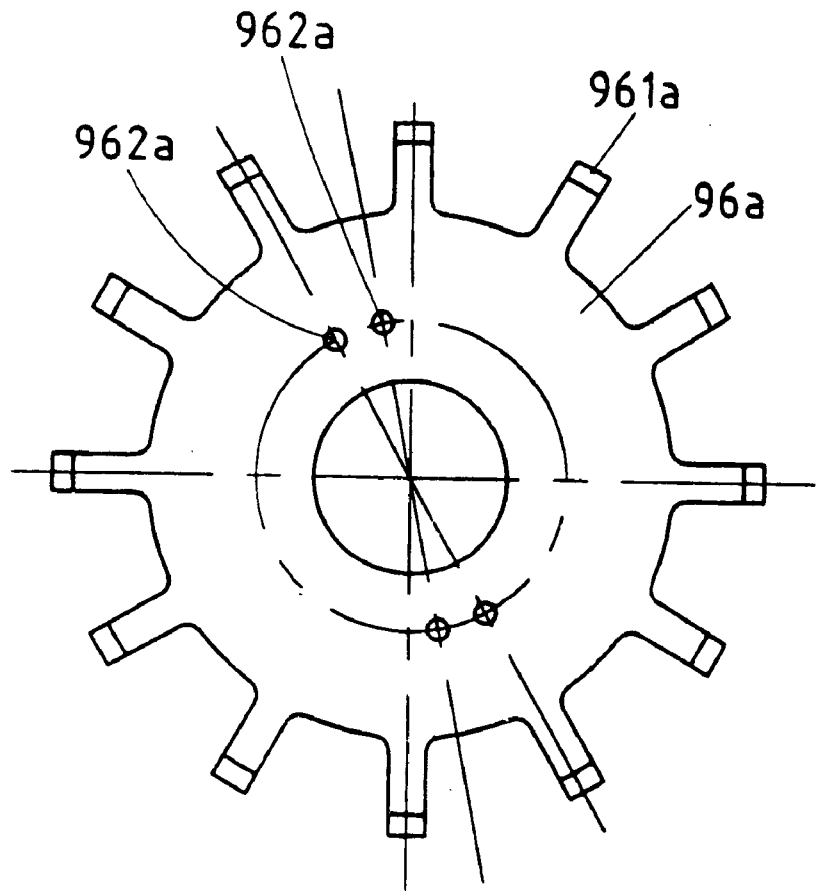
FIG. 9 A cross-section view on one side of the core round disk of a bicycle dynamo.
Figure 10:
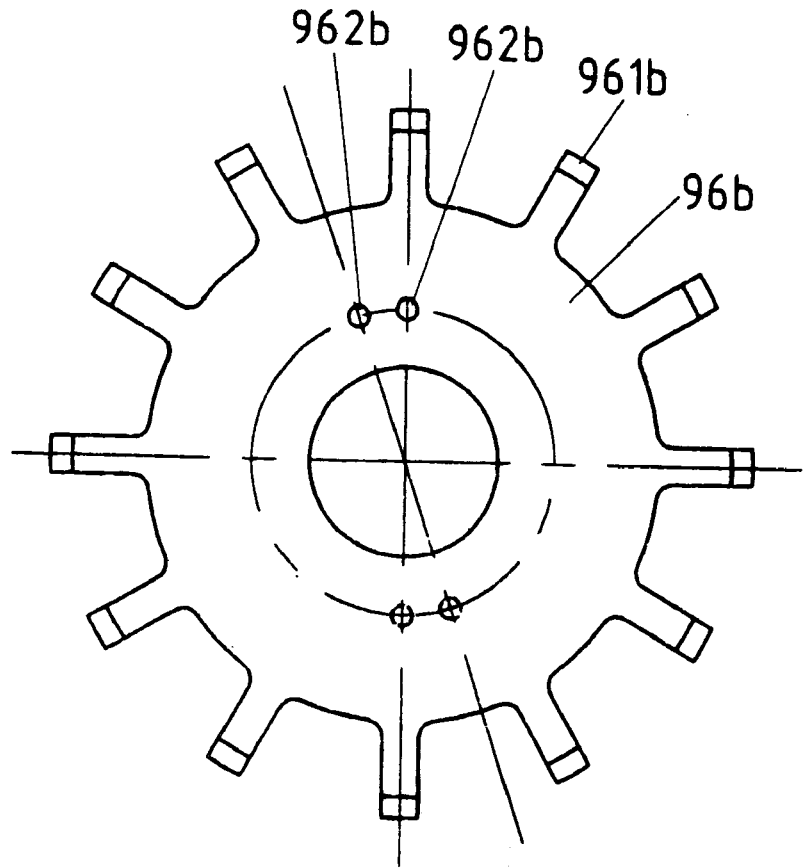
FIG. 10 A side view on the other side of the core round disk of a bicycle dynamo.
Figure 11:
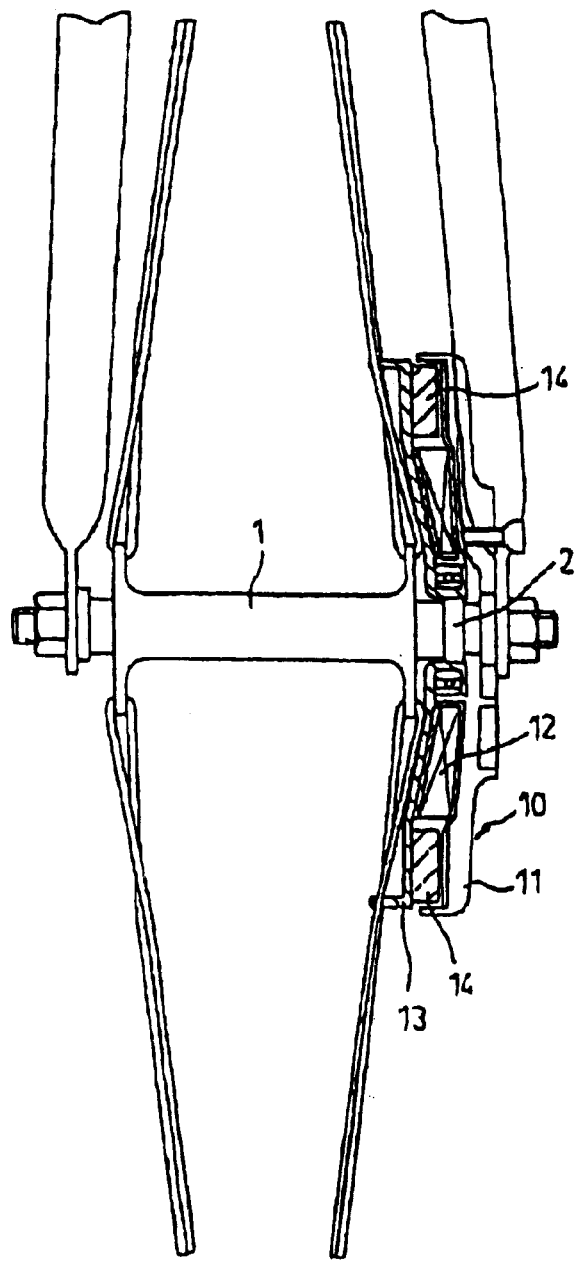
FIG. 11 A cross-section view on conventional design of a round disk-driven dynamo.

Further as shown in FIG. 9 and FIG. 10, two sets of matching insertion holes 962*a*, 962*b* are diagonally set along the surface of each of the round disks 96*a*, 96*b* with the insertion holes 962*a*, 962*b* on different core disks 96*a*, 96*b* made to skew at a set angle. With a stop pin 963 inserted into thru holes 962*a*, 962*b* to position the core disks 96*a*, 96*b*, the alternating legs 961*a*, 961*b* will namely be aligned closely together. Hence, this provides a fairly desirable quick assembly and parts sharing.

Figure 8:
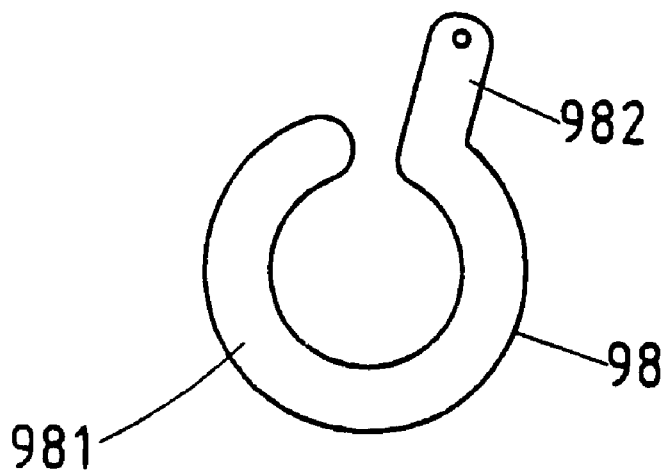
FIG. 8 A line drawing indicating the earth-welding of a bicycle dynamo.

In addition, as shown in FIG. 6 and FIG. 8, where an earth hook 98 is strapped around the position shaft 91, from which one side of the earth hook 98 is made to form a ring-like bent hook 981 hooked to the position shaft 91, with the other side of the hook 98 connected to the wiring one 982 at the earth wire of the coil unit 95. The surface of the two core components are fastened by screws through two connecting nuts to the male screws formed on the male shaft 91 holding the core component 96 and the core unit 95 at fixed places. Either of the embodiments proposed by the design through a disk-type or hub-type dynamos suffices to provide strong enough power to drive an electrical outfit The proposed design as illustrated earlier pertains to having two sets of core components incorporated at the coil unit on the position shaft with each core component made by at least two sets of disks stacking together. Legs are extended from the -perimeter of the disks via an alternating method to form claw units so when the alternating rotation through claw units formed by various legs generating resisting N and S charges, the magnetic changes will then penetrate to the annular lining leading to a starting power of at least 2 courses as the result of the A.C. current generated. And because the A.C. current generated is also of a disproportionate positive curve; the synthesized power made by the positive curves of at least 2 courses will form a trapezoidal-like curve, which sports a stronger kick than a normal positive curve. Therefore, amperage obtained through operating at equal conditions will yield more power than any previous art, hence making an electrical outfit, such as a headlight, shine brighter to provide a long range of lighting.

I claim:

1. A generator apparatus for use on a wheel of a bicycle comprising:

a rotator adapted to be affixed to said wheel so as to rotate with a rotation of the wheel, said rotator having a surface extending therearound;

a fixed number of magnets arranged with opposing polarity to each other around said surface of said rotator;

a main shaft having a insulating core tube fitted thereover;

a conductive annular lining anchored around an outer perimeter of said core tube;

a core unit affixed to said core tube, said core unit comprising a first core component and a second core component arranged in generally parallel relationship, each of said first core component and said second core component comprising at least two disks stacked together, each of said at least two disks having legs extending from a perimeter thereof toward the disks of the other core component, the legs of one disk of said first core component arranged so as to alternate with the legs of another disk of said first core component, the legs of one disk of said second core component arranged so as to alternate with the legs of another disk of said second core components, the legs of said disks of said first and second core components arranged so as to alternate polarities around said core unit; and a coil unit positioned around said core unit such that said legs of said disks are interposed between said coil unit and said fixed number of magnets on said surface of said rotator.

\* \* \* \* \*